3,312,684
OIL GLYCOSIDES OF SOPHOROSE AND FATTY ACID ESTERS THEREOF

John Francis Theodore Spencer, Alexander Patrick Tulloch, and Philip Albert James Gorin, all of Saskatoon, Saskatchewan, Canada, assignors to National Research Council, Ottawa, Ontario, Canada, a body corporate of Canada
No Drawing. Filed Mar. 17, 1965, Ser. No. 440,603
11 Claims. (Cl. 260—210)

This application is a continuation-in-part of Ser. No. 155,174 filed Nov. 27, 1961, entitled, Hydroxy Fatty Acid Production (now U.S.P. 3,205,150).

This development relates to hydroxy fatty acids and their production as glycolipids by a fermentation process.

A strain of the osmophilic yeast *Torulopsis magnoliae* has been found to produce an extracellular, heavier-than-water oil which consists mainly of a mixture of glycosides of $C_{18}$ hydroxy fatty acids. (See Can. J. Chem. vol. 39, pp. 846–855, April 1961.) Normally, mixtures are formed of glycosides of 17-hydroxy-octadecanoic and 17-hydroxy-9-octadecenoic acids with partly acetylated sophorose. Small amounts of glycosides of 15- and 16-hydroxy $C_{16}$ acids are also produced. The disaccharide sophorose consists of two glucose units linked 1-2β-pyranose. It has further been found that the addition of aliphatic compounds such as fatty acids, their esters or long chain hydrocarbons to the medium greatly increases the yield of the glycosides and alters the fatty acid portion. The oily glycolipid product can be recovered by allowing it to settle out of the culture medium. The sophorose moiety may then be separated from the hydroxy fatty acid by hydrolysis.

At present, $C_{16}$ (or above) hydroxy fatty acids are obtained from certain plants and plant seeds, or by synthesis (e.g. using Grignard reagents, reduction of the corresponding keto-acid, and hydroxylation of haloacids or unsaturated acids). The hydroxy fatty acids recovered from natural sources usually have the hydroxyl group(s) near the center of the carbon chain. The hydroxyl group is always introduced near the end of the chain remote from the carboxyl group according to this invention. Fatty acids and fatty acid esters are recovered from various plant and animal sources or are produced by synthesis, and may also result from the fermentative or other action of microorganisms on sugars, starches, etc. A fermentation process with *Ustilago maydis* (U. Zeae) yields ustilagic acid which can be degraded to ustilic acids (mixed polyhydroxy palmitic acids) but the yield is low and the recovery difficult (see U.S.P. 2,809,205, October 8, 1957). Other references to the fermentative production of hydroxy fatty acids have not been noted.

The object of the present invention is to produce glycosides of hydroxy fatty acids by a fermentation giving good yields and allowing ready recovery. A further object is to produce the sugar sophorose and hydroxy fatty acids.

Strains of the yeast *Torulopsis magnoliae* can be isolated from nectar-rich flowers and tested for production of hydroxy fatty acids as outlined below. The isolated hydroxy fatty acid producing strain is grown in aerated culture on a medium comprising a fermentable sugar and a nitrogen source. Suitable substrate sugars include glucose, molasses, starch hydrolysates, and other materials containing glucose, sucrose, raffinose or fructose. Nitrogen sources such as urea, corn steep liquor, and yeast extract are suitable. Preferably yeast extract or corn steep liquor is added in amounts of about 0.2 to about 1.0% by weight of total medium. The concentrations of the sugar may range from about 10 to about 20%, and of the nitrogen source from about 0.2 to about 1.0% or above depending on the nature of the aliphatic compound to be converted. The maintenance of a small amount of sugar in the medium throughout the fermentation is desirable in terms of glycolipid yield. Nutrient salts may be added, but are usually not essential.

The temperature should be maintained in the range of about 20 to 35° C. during the entire fermentation. About 22–25° C. is preferred. The pH of the medium should be about 3.5 to about 4.5. The medium may be buffered, if necessary. Aeration should be carried out such that about 0.25 to about 0.33 vol./vol./min. air is circulated. Somewhat more or less aeration may be tolerated. The medium may be fed directly with oxygen. Satisfactory aerations can be achieved by shaking or agitating such that air diffuses into the flask medium.

After the fermentation has commenced $C_{16}$ to $C_{22}$ (or above) compounds are preferably added to the medium in amounts from about 0.5 to about 2% by weight of total medium. No significant improvement in yield is obtained above about 2%. The compounds fed to the medium are preferably selected from fatty acids, unsaturated fatty acids, hydrocarbons, unsaturated hydrocarbons, esters of the acids, including glycerides and mixtures thereof. Suitable additives include vegetable oils (e.g. olive, soya, rapeseed, linseed), mineral oils, palmitic acid, stearic acid, oleic acid, methyl palmitate, methyl linoleate, methyl eicosenoate, methyl elaidate, octadecane, octadecene, hexadecane, and tall oil fatty acids. The yeast appears to be able to utilize low concentrations of $C_{15}$ to $C_{23}$ n-alkanes in a crude refinery gas oil and leave the rest of the oil untouched. The compounds should be fed at intervals of about 12 to about 24 hours in amounts up to about 2% for each addition. It is possible to add the compound at the start of the fermentation in amounts up to about 2%. The presence of amounts of the compound in excess of about 3–4% appears to have a slight detrimental effect on yields of the desired glycolipids.

Compounds having less than 15 carbon atoms are not significantly hydroxylated or converted. Compounds above $C_{18}$ are usually converted to the $C_{17}$ or $C_{18}$ hydroxy fatty acids (normally an even number of C atoms lower). $C_{16}$ to $C_{18}$ compounds are converted to the corresponding hydroxy fatty acid glycosides without changes in the carbon skeleton.

About 24 to about 48 hours after the last addition of substrate, no significant further conversion is evident. The glycosides of partly acetylated sophorose separate as a heavy oil at the bottom of the vessel and can be isolated by decantation of the supernatant aqueous medium. The hydroxy fatty acids may then be isolated and recovered by deacetylation, and hydrolysis. The deacetylation of the sophorose moiety can be suitably effected by treatment with an ester interchange catalyst such as sodium methoxide in alcohol. The hydroxy fatty acid is cleaved from the sophorose by hydrolysis preferably in acid medium. Deacetylation and hydrolysis may be carried out in one step, if desired. The fatty acids can then be separated into their individual components by chromatography, crystallization, or other means, if desired. Other deacetylation, hydrolysis and purification procedures will be evident to those skilled in the art.

The crude glycolipid usually settles out in amounts of about 5 to 23% (by volume of total medium). Yields of the hydroxy fatty acid usually range from about 50 to about 85% by weight of the added compound.

Any suitable apparatus can be used to carry out the fermentation. Stirred batch fermentors have been found very suitable. Submerged aerated culture gives best results. A continuous culture can be carried out in a staged column apparatus with the substrate ingredients being added at one end and the final effluent being removed at the other end to a settling vessel where the oil separates out.

The heavy oil glycoside may be used itself as a lubricating oil or plasticizer, etc. The resulting hydroxy fatty acids or their esters are suitable for use in perfume synthesis, lubricating oils and greases, surface active agents, plastics (such as polyesters or polyesteramides) among others. The sophorose may be recovered and recycled in this process as the assimilable sugar.

The following examples illustrate the invention:

A suitable strain of the yeast *Torulopsis magnoliae* was isolated as follows. The nectar-containing portion of the flower was placed in a tube of sterile medium containing 20–40% honey and 0.25–0.5% yeast extract and incubated at 30° C. until growth (as indicated by gas formation and turbidity) occurred. A drop of this culture was then spread on a Petri plate containing a medium of similar composition, solidified with agar and cultures of yeast were picked from these plates. These isolates were used to inoculate 500 ml. erlenmeyer flasks containing 50 ml. of the following medium: glucose 10–20%, yeast extract 1–1.2% and urea 0.1%. A rotary shaker (eccentricity 1″, 230 r.p.m.) was used to agitate the flasks during incubation at 30° C. After 3–5 days the flasks were allowed to stand and productive cultures showed a brown oily liquid in the bottom of the flask. Appropriate analysis showed these oils were glycosides of sophorose and hydroxy fatty acids. The cultures can be preserved by any standard method, but remain most active when a freshly inoculated medium is kept frozen until required. A hydroxy fatty acid producing strain has been isolated from the petal portion of a sow thistle. The strain has been deposited with the USDA Agricultural Research Service, Northern Utilization Research and Development Division, Peoria, Illinois, and is designated NRRL Y–5391. Other strains have been isolated in a similar manner.

A 24 hour culture of a hydroxy fatty acid-producing strain of *T. magnoliae* was inoculated into an aqueous medium consisting of 10% by weight glucose, 0.6% yeast extract and 0.1% urea. The total volume in each stirred fermentor was 3 liters and the temperature was maintained at 30° C. The air flow rate was 0.33 vol./vol./min. and agitator speed 375 r.p.m. After 18 hours (from inoculation) the addition of 20 gms. of $C_{16}$ (or above) compound per fermentor per day was commenced. The added compound was melted before addition to aid dispersion. Emulsification before addition will also aid dispersion but is not essential. The addition was continued for 7 days until 140 gm. had been added. Twenty-four hours later the product was harvested by decantation of the supernatant medium. The crude glycolipid was dried with anhydrous $MgSO_4$ or $Na_2SO_4$ filtered and evaporated to leave a yellow-brown viscous syrup. The purified oil was dissolved in refluxing methanol and sodium metal added until the solution became alkaline. After about 30 minutes refluxing, methyl acetate was distilled off. The deacetylated syrup was refluxed with excess methanolic hydrogen chloride, diluted with water and the fatty acid methyl esters extracted with chloroform. The principal hydroxy fatty acids were isolated where necessary by fractional crystallization, distillation or chromatography procedures or a combination thereof. The yields are summarized in Table I.

TABLE I.—HYDROXY FATTY ACID YIELDS

| Compound Added | Principal Fatty Acid Recovered | Yield Total Hydroxy Fatty Acids (percent by wt. of added compound) |
|---|---|---|
| Myristic | Hydroxy $C_{14}$, $C_{16}$, and $C_{18}$ | 20 |
| Methyl palmitate | 15- and 16-hydroxy palmitic | 80 |
| Stearic acid | 17-hydroxy stearic | 64 |
| Methyl oleate | 17-hydroxy oleic | 85 |
| Methyl linoleate | 17- and 18-hydroxy linoleic | 60 |
| Methyl 11-eicosenoate | 17-hydroxy oleic | 52 |
| Methyl erucate | do | 51 |
| Hexadecane | 15- and 16-hydroxy palmitic | 56 |
| Octadecane | 17-hydroxy stearic | 50 |
| Eicosane | 17-hydroxy stearic | 54 |
| Docosane | do | 64 |
| Olive oil | 17-hydroxy oleic | 66 |
| Linseed oil | Hydroxy $C_{18}$ | 50 |
| Tall oil fatty acids | Hydroxy oleic and linoleic acids | 70 |
| Hydrogenated soya | Hydroxy $C_{18}$ | 70 |
| Rapeseed oil | Mostly hydroxy $C_{18}$ | 80 |

The types of hydroxy fatty acids isolated for the various compounds added are summarized in Table II. The separation of the individual components was carried out by gas chromatography using a 30″ x ¼″ 1:6 silicone on diatomaceous earth column following the procedure of B. M. Craig and N. L. Murty in Can. J. Chem., vol. 36, p. 1297 (1958).

Yields of castor oil, using four additions of 15 g. each gave a final yield of 5% by volume or a conversion to hydroxy fatty acid of about 60%.

TABLE II.—WT. PERCENT COMPOSITION OF HYDROXYLATED PRODUCT

| Recovered Hydroxylated Compounds | Added Substrate | | | | | | | | | | |
|---|---|---|---|---|---|---|---|---|---|---|---|
| | None, Percent | Methyl Stearate, Percent | Methyl Oleate, Percent | Methyl Linoleate, Percent | Methyl Palmitate, Percent | Methyl 11-Eicosenoate, Percent | Methyl Erucate, Percent | Hexadecane, Percent | Octadecane, Percent | Eicosane, Percent | Docosane, Percent |
| 15-OH $C_{16}$ | 10 | 2 | 2 | 1 | 40 | 2 | 4 | 37 | 2 | 8 | 8 |
| 16-OH $C_{16}$ | 11 | 2 | 2 | 2 | 40 | 4 | 6 | 43 | 4 | 7 | 9 |
| Satd. 17-OH $C_{18}$ | 21 | 80 | 6 | 4 | 5 | 9 | 5 | 5 | 85 | 57 | 67 |
| Unsatd. 17-OH $C_{18}$ | 50 | 9 | 77 | 37 | 14 | 56 | 65 | 13 | 4 | 8 | 9 |
| Unsatd. 18-OH $C_{18}$ | 6 | | 13 | 56 | 1 | 11 | 12 | 2 | | 2 | 3 |
| Others | 2 | 8 | | | | 18 | 8 | | 5 | 18 | 4 |
| Total Satd. Cpds | 41 | 84 | 9 | 8 | 85 | 14 | 12 | 85 | 91 | 86 | 84 |

From Tables I and II it is evident that about 80% of palmitic acid or its esters are converted (80% selectivity) to 15- and 16-hydroxy palmitic acid while about 65% of stearic acid or its esters are converted (80% selectivity) to 17-hydroxy stearic acid. Myristic acid (and compounds below about $C_{15}$ are not significantly hydroxylated. Unsaturated $C_{18}$ acids are converted to the corresponding unsaturated 17- and 18-hydroxy fatty acids. The linoleate (diunsaturated) substrate results in a major proportion of ω(18-) hydroxy fatty acid (still mainly diunsaturated). The addition of $C_{18}$ compounds suppresses the normal formation of $C_{16}$ compounds. The addition of saturated compounds suppresses the normal formation of unsaturated compounds. Slightly lower conversions of the $C_{20}$ and $C_{22}$ compounds are obtained, with reduction in the chain length taking place. Aliphatic hydrocarbons are converted in approximately the same yields and conversions to the hydroxy fatty acids with the carbon skeleton and position of hydroxylation being much the same as for the added fatty acids. However, alkenes with the double bond near or at the end of the chain (such as α-olefins) are converted less readily and give only about half the yields obtained with n-alkanes. It has also been found that a $C_{19}$ fatty acid is partly converted to a hydroxy $C_{17}$ acid (with some of the $C_{19}$ acid also being hydroxylated and forming glycoside). Hydroxylated compounds (e.g. 12-hydroxy methyl stearate and octadecanol) have been found to be converted to a lesser extent to desired glycolipid, but in some instances the additive may comprise them.

Hydroxy fatty acids which would be difficult to synthesize are readily obtained according to the invention. By using suitable substrates a variety of saturated or unsaturated hydroxy acids can be obtained. Good yields and conversions to single hydroxy fatty acids are possible. Mixtures of compounds can be fed to yield desired mixtures of hydroxy fatty acids—both saturated and unsaturated. The added substrates need not be pure —the yeast can utilize the $C_{16}$ or above compounds from crude mineral or vegetable oils or from tall oil.

It has been found that in some instances, in the oil glycoside as produced, the fatty acid carboxylic acid group forms part of a lactone group with a sugar hydroxyl group. The reasons or conditions responsible for this lactonization in some of the glycosides are not understood. The glycoside contains approximately two acetyl groups (on the sugar hydroxyl groups) per molecule, rendering the glycoside miscible with no more than approximately its own weight of water. The deacetylated oil glycoside is completely water soluble. The carboxylic acid group in the glycoside (deacetylated) may subsequently be completely esterified, if desired, giving a product which, in the case of the methyl and butyl esters at least, is still water soluble. Esters of the partly acetylated glycosides are substantially insoluble in water.

Further work has been done on the fermentation of of alcohols particularly $C_{15}$ to $C_{23}$ n-alcohols, both saturated and unsaturated. These alcohols are converted partly (about 60%) to the same hydroxy fatty acid glycosides as would be produced by fermentation of the corresponding fatty acid, but the remainder (about 40%) is converted to a sophoroside of the alcohol without any hydroxylation. These latter sophorosides may be advantageously used directly as non-ionic surface active agents. An alcohol fermentation is illustrated in the following example.

Fifty ml. of a medium consisting essentially of glucose (10%), yeast extract (0.8%) and urea (0.1%) was put in a 500 ml. conical flask and agitated on a shaker of 230 r.p.m. and radius 1 inch. An oil glycolipid-producing strain of *Torulopsis magnoliae* was inoculated into the flask which was then shaken for one day. Oleyl alcohol (one g.) was added as an emulsion or suspension in water, and the shaking continued for 2 to 3 days. The oily product (1.5 g.) was isolated from the medium by allowing it to settle in a centrifuge tube. The product formed a layer at the bottom of the tube, and the yeast cells and medium were decanted or siphoned off. Any unreacted alcohols were removed by extraction with petroleum ether B.P. 60–80° C.

The hydrolysis of the oil product and analysis by gas liquid chromatography was carried out as described by Tulloch et al. Can. J. Chem. 40, 1333 (1962). Thirty to fourty percent oleyl alcohol and sixty to seventy percent methyl esters of hydroxy fatty acids were contained in the hydrolysis product. Similar runs have been carried out with hexadecanol and octadecanol feeds and corresponding yields obtained.

Animal fats can be successfully fermented according to the process. The following example illustrates the conversion of tallow to hydroxy fatty acid glycolipid.

Three litres of a medium containing 10% glucose, 0.4 to 0.8% yeast extract and 0.1% urea was inoculated with a hydroxy fatty acid producing strain *T. magnoliae*. Beef tallow was added in portions of 25 g./day to a total of 150 g. Final yields of glycolipid were 9 to 12% by volume, giving total yields of 270 to 360 g. of product, or a conversion rate of 45 to 60% of tallow to hydroxy fatty acid (mainly hydroxy $C_{18}$ acids).

Yields and conversion rates for hydrogenated tallow were approximately half of those for tallow.

We claim:
1. The oil glycoside of the disaccharide sophorose, and fatty acids having 15 to 19 carbon atoms, hydroxylated in one of the omega, and the omega-minus-one positions.
2. The oil glycoside of claim 1 wherein the disaccharide is partly acetylated with approximately two acetyl groups.
3. The oil glycoside of claim 1 wherein the fatty acids contain unsaturation.
4. The oil glycoside of claim 1 wherein the fatty acid carboxylic acid group is part of a lactone group with a sugar hydroxyl.
5. The oil glycoside of claim 1 wherein the fatty acid carboxylic acid groups are esterified with lower alkyl groups.
6. The oil glycoside of claim 1 wherein the fatty acids are obtained from compounds selected from $C_{15}$ to $C_{23}$ n-alkanes and n-alkenes.
7. The oil glycoside of claim 1 wherein the fatty acids are a mixture obtained from vegetable oils.
8. The oil glycoside of claim 1 wherein the fatty acids are a mixture obtained from mineral oils.
9. The oil glycoside of claim 1 wherein the fatty acids are a mixture obtained from one of the group tall oil and animal fat.
10. The oil glycoside of the disaccharide sophorose and n-alcohols having 15 to 19 carbon atoms.
11. The oil glycoside of claim 10 wherein the glycoside is party acetylated with approximately two acetyl groups.

References Cited by the Examiner

UNITED STATES PATENTS

| 2,973,353 | 2/1961 | Gaertner | 260—210 |
|---|---|---|---|
| 3,053,830 | 9/1962 | Gaertner | 260—210 |

OTHER REFERENCES

Gorin et al.: "Canadian Jour. Chem.," vol. 39, 1961, pages 846–855.

LEWIS GOTTS, *Primary Examiner.*

JOHNNIE R. BROWN, *Assistant Examiner.*